United States Patent
Cheng et al.

(10) Patent No.: US 12,093,111 B2
(45) Date of Patent: Sep. 17, 2024

(54) ELECTRONIC DEVICE AND PERFORMANCE OPTIMIZATION METHOD THEREOF

(71) Applicant: ASUSTeK COMPUTER INC., Taipei (TW)

(72) Inventors: Po-Han Cheng, Taipei (TW);
Chin-Chang Chang, Taipei (TW);
Po-Hsin Chang, Taipei (TW);
Shih-Hao Chen, Taipei (TW);
Kai-Peng Chung, Taipei (TW);
Ci-Syuan Wu, Taipei (TW); Chun Tsao, Taipei (TW); Teng-Chih Wang, Taipei (TW); Sheng-Yi Chen, Taipei (TW); Guan-Heng Lai, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 63 days.

(21) Appl. No.: 17/965,782

(22) Filed: Oct. 14, 2022

(65) Prior Publication Data
US 2023/0266813 A1      Aug. 24, 2023

(30) Foreign Application Priority Data
Feb. 24, 2022    (TW) .................................. 111106707

(51) Int. Cl.
*G06F 1/3234*    (2019.01)
*G06F 1/26*    (2006.01)
*G06F 1/3212*    (2019.01)

(52) U.S. Cl.
CPC ............ *G06F 1/3243* (2013.01); *G06F 1/263* (2013.01); *G06F 1/3212* (2013.01)

(58) Field of Classification Search
CPC ....... G06F 1/3243; G06F 1/263; G06F 1/3212
See application file for complete search history.

(56) References Cited

U.S. PATENT DOCUMENTS

| | | | |
|---|---|---|---|
| 2002/0099962 A1* | 7/2002 | Nakamura | G06F 1/3203 713/300 |
| 2019/0041953 A1* | 2/2019 | Hijazi | G06F 1/3296 |
| 2019/0239384 A1* | 8/2019 | North | G06F 1/3296 |
| 2021/0096633 A1* | 4/2021 | Rintamaeki | G05B 17/02 |
| 2022/0155833 A1* | 5/2022 | Watanabe | G06F 1/1616 |
| 2022/0404888 A1* | 12/2022 | Prabhakar | G06F 1/3228 |

FOREIGN PATENT DOCUMENTS

| | | |
|---|---|---|
| CN | 111208896 | 5/2020 |
| CN | 111654093 | 9/2020 |
| CN | 110286733 | 10/2020 |
| CN | 112328065 | 2/2021 |

* cited by examiner

*Primary Examiner* — Nimesh G Patel
(74) *Attorney, Agent, or Firm* — JCIPRNET

(57) ABSTRACT

An electronic device and a performance optimization method thereof are provided. The electronic device includes a battery module, a processor, and a controller. The battery module is configured to supply power to the electronic device. The processor has a power limit. The controller is configured to monitor a charging and discharging current of the battery module. In a power connection mode, the controller analyzes a status of the battery module and adjusts the power limit of the processor according to the charging and discharging current.

14 Claims, 2 Drawing Sheets

ELECTRONIC DEVICE AND PERFORMANCE OPTIMIZATION METHOD THEREOF

CROSS-REFERENCE TO RELATED APPLICATION

This application claims the priority benefit of Taiwan application serial No. 111106707, filed on Feb. 24, 2022. The entirety of the above-mentioned patent application is hereby incorporated by reference herein and made a part of the specification.

BACKGROUND

Field of the Invention

The disclosure relates to an electronic device for dynamically adjusting a power limit and a performance optimization method thereof.

Description of the Related Art

A current handheld electronic product (such as a notebook computer, a mobile phone, and a tablet computer) leaves a factory with a power adapter and a built-in battery or an external battery. Generally, in consideration of costs, a power adapter with a lower wattage is included. When a processor with higher performance is used in a product, the product is prone to problems of overloading, overheating, and non-compliance with safety regulations due to excessive energy consumption. Although a battery and a power adapter are used simultaneously to improve power supply, it is not possible to use the battery for a long time for the reason that in this state, charging of the battery is not allowed and the battery keeps discharging. In addition, extra power consumption is incurred when the product is externally connected to another device.

SUMMARY

According to the first aspect of this disclosure, an electronic device including a battery module, a processor, and a controller is provided. The battery module is configured to supply power to the electronic device. The processor has a power limit. The controller is coupled to the battery module and the processor for monitoring a charging and discharging current of the battery module. In a power connection mode, the controller analyzes a status of the battery module and adjusts the power limit of the processor according to the charging and discharging current.

According to the second aspect of the disclosure, a performance optimization method is provide. The performance optimization method is applied to an electronic device including a processor and a battery module. The performance optimization includes the following steps: monitoring the charging and discharging current of the battery module; and in a power connection mode, analyzing a status of the battery module and adjusting the power limit of the processor according to the charging and discharging current.

Based on the above, the electronic device and the performance optimization method thereof in the disclosure adjust the power limit of the processor according to charging and discharging currents in different use scenarios, so as to reach a balance between energy consumption and performance and provide a user with better use experience.

To make the above features and advantages of the disclosure more comprehensible, the disclosure is described in detail below through embodiments with reference to the accompanying drawings.

DESCRIPTION OF THE EMBODIMENTS

Figure 1:
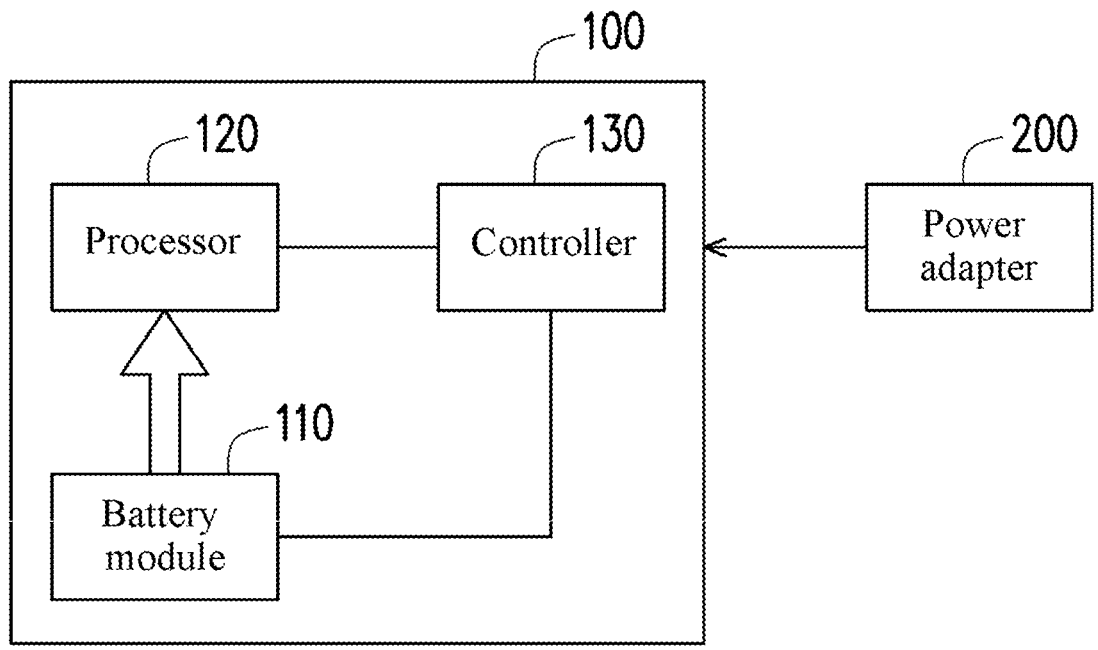
FIG. 1 is a schematic block diagram of an electronic device according to an embodiment of the disclosure.

In an embodiment, referring to FIG. 1 an electronic device 100 is a handheld electronic product such as a notebook computer, a mobile phone, and a tablet computer. The electronic device 100 includes a battery module 110, a processor 120, and a controller 130.

The battery module 110 is configured to supply power to the electronic device 100 and is configured as a built-in type or an external type. In an embodiment, the battery module 110 includes a battery cell group and a control circuit. In an embodiment, the battery cell group is formed by a single battery or a plurality of battery cells (battery core cells). In an embodiment, the control circuit includes a battery gauge chip (IC), which calculates stored electricity and a charging and discharging current of the battery module 110. In this embodiment, when the battery module 110 is being charged by a power adapter 200 to be in a charging state, the battery gauge chip returns that the charging and discharging current is a positive value, and when the battery module 110 is supplying power to the electronic device 100 to be in a discharging state, the battery gauge chip returns that the charging and discharging current is a negative value.

In an embodiment, the processor 120 is a central processing unit (CPU), or another programmable general-purpose or special-purpose microprocessor, a digital signal processor (DSP), a programmable controller, an application specific integrated circuit (ASIC) or another similar element, or a combination of the above elements. The processor 120 has a power limit. In an embodiment, the power limit in this embodiment is a long-time power limit PL1 in watts formulated in the package power control specification of Intel.

The controller 130 is coupled to the battery module 110 and the processor 120. In an embodiment, the controller 130 is a programmable chip such as an embedded controller (EC) or a microcontroller that communicates with the battery module 110 through a communication protocol. The controller 130 is configured to monitor the charging and discharging current of the battery module 110. In an embodiment, the communication protocol is a system management bus (SMBus) or an inter-integrated circuit (I2C), but this embodiment is not limited thereto.

In an embodiment, the power adapter 200 is an AC adapter. In this embodiment, when the power adapter 200 is inserted into the electronic device 100, the battery module 110 starts to be charged. In addition, the electronic device 100 enters a power connection mode indicating that the power adapter 200 is connected. In addition, when the power adapter 200 is pulled out from the electronic device 100, the electronic device 100 exits the power connection mode.

The controller 130 dynamically adjusts the power limit of the processor 120 according to a current use scenario of the electronic device 100, thereby performing performance optimization. The following describes detailed steps of a performance optimization method in the disclosure by listing embodiments.

Figure 2:
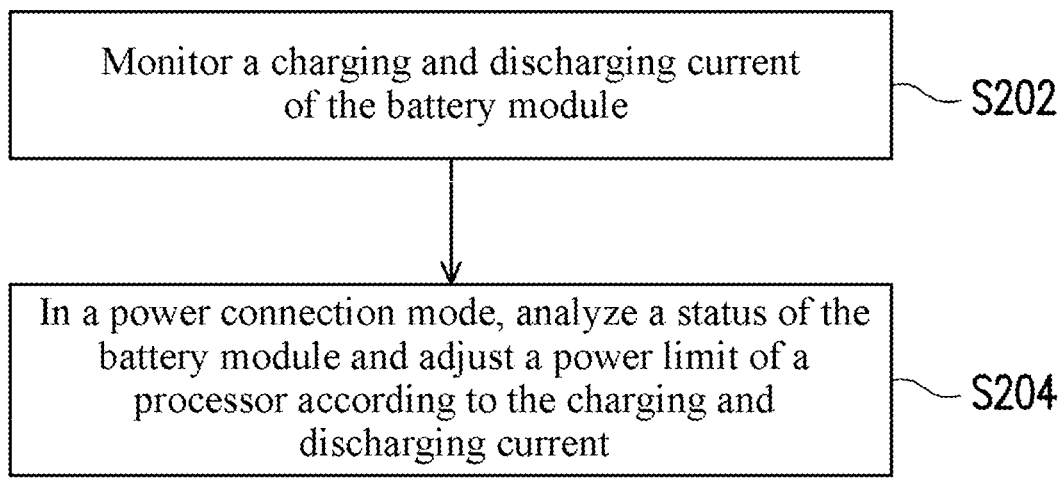
FIG. 2 is a flowchart of a performance optimization method according to an embodiment of the disclosure.

Referring to both FIG. 1 and FIG. 2, the method of this embodiment is applicable to the electronic device 100 in FIG. 1 and the steps thereof are described as follows:

First, in step S202, the controller 130 monitors the charging and discharging current of the battery module 110. In an embodiment, the battery gauge chip in the battery module 110 returns a current value of a current charging and discharging current to the controller 130 at intervals of 0.25 seconds. After the controller 130 collects four current values at intervals of 0.25 seconds, an average value of the four current values is calculated as a current value of the charging and discharging current for the current second and the charging and discharging current for a next second is continuously monitored in a same manner.

Next, in step S204, in the power connection mode, the controller 130 analyzes a status of the battery module 110 and adjusts the power limit of the processor 120 according to the charging and discharging current of the battery module 110. The controller 130 first determines whether the electronic device 100 is in the power connection mode. When the electronic device 100 is in the power connection mode, subsequent analysis and adjustment are started. For a detailed description of analysis and adjustment steps, reference may be made to steps in FIG. 3.

Figure 3:
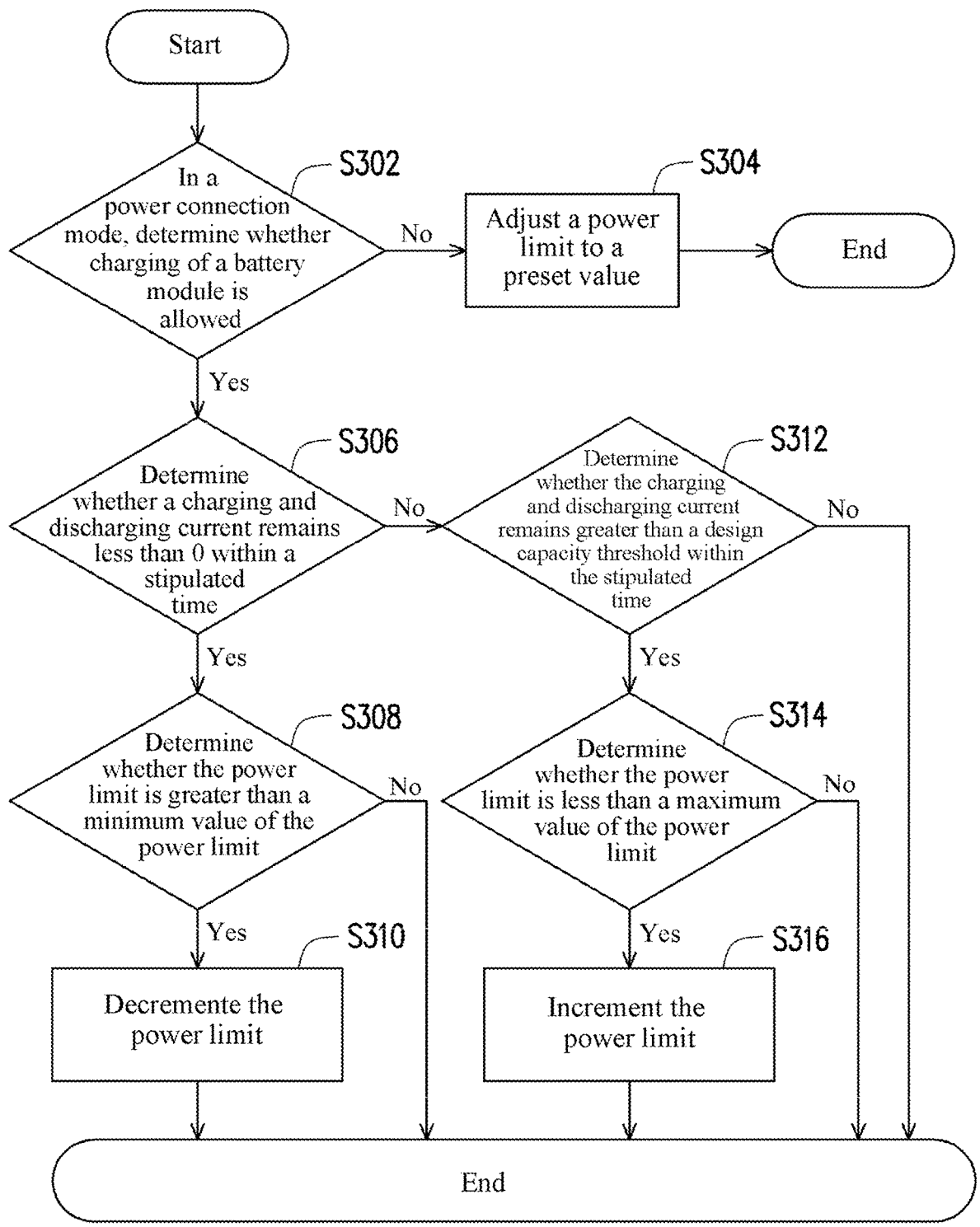
FIG. 3 is a flowchart of a performance optimization method according to an embodiment of the disclosure.

Referring to both FIG. 1 and FIG. 3, first, in step S302, in the power connection mode, the controller 130 determines whether charging of the battery module 110 is allowed. Specifically, the controller 130 determines, according to a logic level of a charging flag bit, whether charging of the battery module 110 is allowed. Regarding the charging flag bit, the controller 130 controls the charging flag bit according to a charging standard set by a user through an application related to power management. In an embodiment, the user sets the charging standard to 60%, 80%, or 100% through the application of the power management. In an embodiment, the charging standard is set to 60%. When the stored electricity of the battery module 110 does not reach 60%, the charging flag bit remains at logic 0 (low logic level). When the controller 130 detects that the stored electricity of the battery module 110 reaches or exceeds 60%, the controller 130 sets the charging flag bit to logic 1 (high logic level). Therefore, when the charging flag bit is the logic 0, the controller 130 determines that charging of the battery module 110 is allowed, and when the charging flag bit is the logic 1, the controller 130 determines that charging of the battery module 110 is not allowed.

When charging of the battery module 110 is not allowed (when the charging flag bit is the logic 1, it indicates that there is sufficient stored electricity), in step S304, the controller 130 adjusts the power limit to a preset value. The performance optimization method of this embodiment is ended. In an embodiment, the preset value is 34 watts, which is equal to a maximum value to which the long-time power limit PL1 is adjustable and allows the processor 120 to have higher performance. In an embodiment, the maximum value of the long-time power limit PL1 is equal to a short-time power limit PL2 formulated in the package power control specification of Intel.

When charging of the battery module 110 is still allowed (the charging flag bit is the logic 0), in step S306, the controller 130 determines whether the charging and discharging current remains less than 0 within a stipulated time. In an embodiment, the stipulated time is 10 seconds to determine a steady state of the charging and discharging current. When the charging and discharging current remains less than 0 within the stipulated time, it indicates that the battery module 110 is in a discharging state, and in step S308, the controller determines whether the power limit is greater than a minimum value (in an embodiment, a minimum value to which the long-time power limit PL1 is adjustable in a system of the electronic device 100) of the power limit. If yes, in step S310, the controller 130 decrements the power limit. That is, a current power limit is reduced by 1 watt. The performance optimization method of this embodiment is ended. If not, the performance optimization method is directly ended without adjusting the power limit.

According to another aspect, if the controller 130 determines that the charging and discharging current does not remain less than 0 within the stipulated time in step S306, it indicates that the battery module 110 is in a charging state. In step S312, the controller 130 determines whether the charging and discharging current remains greater than a design capacity threshold within the stipulated time. In an embodiment, the design capacity threshold is a value obtained by multiplying a design capacity of the battery cell group in the battery module 110 by 0.1.

When the charging and discharging current remains greater than the design capacity threshold within the stipulated time, in step S314, the controller determines whether the power limit is less than a maximum value (in an embodiment, the maximum value to which the long-time power limit PL1 is adjustable in the system of the electronic device 100) of the power limit. If yes, in step S316, the controller 130 increments the power limit, that is, the current power limit is increased by 1 watt, and the performance optimization method of this embodiment is ended. If not, the performance optimization method is directly ended without adjusting the power limit.

If the controller 130 determines that the charging and discharging current does not remain greater than the design capacity threshold within the stipulated time in step S312, the performance optimization method of this embodiment is also ended.

In an embodiment, as soon as the power adapter 200 is inserted into the electronic device 100 (enters the power connection mode), the controller 130 continuously repeats the steps of analyzing a status of the battery module 110 and adjusting a power limit of the processor 120 (that is, the steps shown in FIG. 3) until the power adapter 200 is pulled out and the electronic device 100 exits the power connection mode.

In addition, when the power adapter 200 is pulled out and the electronic device 100 exits the power connection mode, the controller 130 adjusts the power limit to the preset value, so that processing is continued when the power connection mode is entered next time.

In summary, the electronic device and the performance optimization method thereof in the disclosure consider relaxing or strengthening restriction on the performance of the processor according to charging and discharging currents in different use scenarios and adjust the power limit of the processor, so as to reach a balance between energy consumption and performance and provide a user with better use experience.

What is claimed is:
1. An electronic device, comprising:
a battery module, configured to supply power to the electronic device;
a processor, having a power limit; and a controller, coupled to the battery module and the processor for monitoring a charging and discharging current of the battery module, wherein in a power connection mode, the controller analyzes a status of the battery module and adjusts the power limit of the processor according to the charging and discharging current, wherein the controller determines whether the charging and discharging current remains less than 0 within a stipulated time, when the charging and discharging current does not remain less than 0 within the stipulated time, the battery module is in a charging state, the controller determines whether the charging and discharging current remains greater than a design capacity threshold within the stipulated time, and when the charging and discharging current remains greater than the design capacity threshold within the stipulated time, the controller determines whether the power limit is less than a maximum value of the power limit, and if yes, the controller increments the power limit.

2. The electronic device according to claim 1, wherein when the charging and discharging current remains less than 0 within the stipulated time, the battery module is in a discharging state, the controller determines whether the power limit is greater than a minimum value of the power limit, and if yes, the controller decrements the power limit.

3. The electronic device according to claim 1, wherein in the power connection mode, the controller determines whether charging of the battery module is allowed, and when charging of the battery module is not allowed, the controller adjusts the power limit to a preset value.

4. The electronic device according to claim 3, wherein the controller determines, according to a logic level of a charging flag bit, whether charging of the battery module is allowed.

5. The electronic device according to claim 1, wherein the controller repeats the steps of analyzing the status of the battery module and adjusting the power limit of the processor until the electronic device exits the power connection mode.

6. The electronic device according to claim 1, wherein when the electronic device exits the power connection mode, the controller adjusts the power limit to a preset value.

7. The electronic device according to claim 1, wherein when a power adapter is inserted into the electronic device, the electronic device enters the power connection mode, and when the power adapter is pulled out from the electronic device, the electronic device exits the power connection mode.

8. A performance optimization method applicable to an electronic device that comprises a processor and a battery module, the method comprising the following steps:
monitoring a charging and discharging current of the battery module; and
in a power connection mode, analyzing a status of the battery module and adjusting a power limit of the processor according to the charging and discharging current, wherein the step of adjusting the power limit of the processor according to the charging and discharging current comprises:

determining whether the charging and discharging current remains less than 0 within a stipulated time;

when the charging and discharging current does not remain less than 0 within the stipulated time, indicating the battery module is in a charging state, determining whether the charging and discharging current remains greater than a design capacity threshold within the stipulated time; and when the charging and discharging current remains greater than the design capacity threshold within the stipulated time, determining whether the power limit is less than a maximum value of the power limit, and if yes, incrementing the power limit.

9. The performance optimization method according to claim 8, wherein the step of adjusting the power limit of the processor according to the charging and discharging current comprises:

when the charging and discharging current remains less than 0 within the stipulated time, indicating the battery module is in a discharging state, determining whether the power limit is greater than a minimum value of the power limit, and if yes, decrementing the power limit.

10. The performance optimization method according to claim 8, wherein the step of analyzing a status of the battery module comprises:

in the power connection mode, determining whether charging of the battery module is allowed; and when charging of the battery module is not allowed, adjusting the power limit to a preset value.

11. The performance optimization method according to claim 10, wherein the step of determining whether charging of the battery module is allowed comprises:

determining whether charging of the battery module is allowed according to a logic level of a charging flag bit.

12. The performance optimization method according to claim 8, further comprising:

repeating the steps of analyzing a status of the battery module and adjusting a power limit of the processor until the electronic device exits the power connection mode.

13. The performance optimization method according to claim 8, further comprising:

adjusting the power limit to a preset value when the electronic device exits the power connection mode.

14. The performance optimization method according to claim 8, wherein, the electronic device enters the power connection mode when a power adapter is inserted into the electronic device, and the electronic device exits the power connection mode when the power adapter is pulled out from the electronic device.

* * * * *